United States Patent
Kato et al.

(10) Patent No.: US 7,550,232 B2
(45) Date of Patent: Jun. 23, 2009

(54) LITHIUM-ION RECHARGEABLE BATTERY WITH NEGATIVE ELECTRODE MATERIAL MIXTURE COMPRISING GRAPHITE AND CARBON NANO-TUBES

(75) Inventors: Fumio Kato, Kadoma (JP); Hizuru Koshina, Neyagawa (JP)

(73) Assignee: Panasonic Corporation, Osaka (JP)

(*) Notice: Subject to any disclaimer, the term of this patent is extended or adjusted under 35 U.S.C. 154(b) by 155 days.

(21) Appl. No.: 10/858,389

(22) Filed: Jun. 2, 2004

(65) Prior Publication Data
US 2004/0248010 A1 Dec. 9, 2004

(30) Foreign Application Priority Data
Jun. 9, 2003 (JP) ............................. 2003-163739

(51) Int. Cl.
*H01M 4/58* (2006.01)
(52) U.S. Cl. ............. 429/231.8; 429/231.4; 429/231.95
(58) Field of Classification Search ............... 429/238.1, 429/231.8
See application file for complete search history.

(56) References Cited

U.S. PATENT DOCUMENTS

| 5,028,500 | A | * | 7/1991 | Fong et al. ................. 429/224 |
| 6,730,398 | B2 | | 5/2004 | Morita et al. |
| 7,060,390 | B2 | * | 6/2006 | Chen et al. ............... 429/231.8 |
| 2003/0044603 | A1 | | 3/2003 | Morita et al. |
| 2003/0152835 | A1 | * | 8/2003 | Dasgupta et al. ............ 429/232 |
| 2004/0166048 | A1 | | 8/2004 | Morita et al. |
| 2006/0233692 | A1 | * | 10/2006 | Scaringe et al. ............. 423/335 |
| 2006/0241237 | A1 | * | 10/2006 | Drzal et al. ................ 524/495 |
| 2006/0286025 | A1 | * | 12/2006 | Spahr et al. ................ 423/448 |

FOREIGN PATENT DOCUMENTS

| CN | 1373526 | | 10/2002 |
| CN | 1373526 | A * | 10/2002 |
| JP | 4-155776 | | 5/1992 |
| JP | 4-190555 | | 7/1992 |
| JP | 4-237971 | | 8/1992 |
| JP | 4-332465 | | 11/1992 |
| JP | 5-159804 | | 6/1993 |
| JP | 5-307958 | | 11/1993 |

(Continued)

OTHER PUBLICATIONS

Japanese Office Action issued in Japanese Patent Application No. JP 2003-163739, dated on Mar. 6, 2008.

*Primary Examiner*—Mark Ruthkosky
*Assistant Examiner*—Karie O'Neill
(74) *Attorney, Agent, or Firm*—McDermott Will & Emery LLP (57) ABSTRACT

A lithium-ion rechargeable battery, comprising a positive electrode capable of absorbing and desorbing lithium ions, a negative electrode capable of absorbing and desorbing lithium ions, a separator interposed between the positive electrode and the negative electrode, and a non-aqueous electrolyte, wherein the negative electrode comprises a negative electrode current collector and a negative electrode material mixture layer carried on the negative electrode current collector, the negative electrode material mixture layer comprises graphite and carbon nano-tubes, and an amount of the carbon nano-tubes in the negative electrode material mixture layer is not smaller than 0.1 part by weight and not larger than 10 parts by weight, per 100 parts by weight of the graphite.

4 Claims, 3 Drawing Sheets

FOREIGN PATENT DOCUMENTS

| | | |
|---|---|---|
| JP | 6-310142 | 11/1994 |
| JP | 7-14573 | 1/1995 |
| JP | 8-45545 | 2/1996 |
| JP | 8-264181 | 10/1996 |
| JP | 9-63584 | 3/1997 |
| JP | 9-251855 | 9/1997 |
| JP | 9-259886 | 10/1997 |
| JP | 10-188959 | 7/1998 |
| JP | 11-54123 | 2/1999 |
| JP | 11054123 A * | 2/1999 |
| JP | 11-263612 | 9/1999 |
| JP | P2000-138061 A | 5/2000 |
| JP | 2001-266873 | 9/2001 |
| JP | P2002-25612 A | 1/2002 |
| JP | 2003-073930 | 3/2003 |

* cited by examiner

LITHIUM-ION RECHARGEABLE BATTERY WITH NEGATIVE ELECTRODE MATERIAL MIXTURE COMPRISING GRAPHITE AND CARBON NANO-TUBES

BACKGROUND OF THE INVENTION

The present invention relates to a lithium-ion rechargeable battery, comprising a negative electrode that comprises graphite as an active material and carbon nano-tubes as a conductive additive.

As electronic equipments are increasingly made portable and cordless, small-sized, lightweight lithium-ion rechargeable batteries having a high energy density are drawing attention as power sources for driving such electronic equipments. Rocking chair type lithium-ion rechargeable batteries have already come into practice and rapidly become common. A typical lithium-ion rechargeable battery comprises a positive electrode comprising a lithium-containing transition metal composite oxide as an active material, a negative electrode comprising a carbon material as an active material, a separator, and a non-aqueous electrolyte.

In particular, graphite with high crystallinity has recently been in the mainstream of carbon materials to be used as the negative electrode active material. Graphite is advantageous in the following aspects: (1) electronic conductivity of graphite is high and discharge performance with a large current is excellent; (2) an electrical potential change of graphite during discharge is small and graphite is thus suitable for such applications as discharging with a constant electric power; and (3) graphite has a large true density and is obtained as particles with a large bulk density and is advantageous for increasing an energy density of a battery.

Graphite for a negative electrode of lithium-ion rechargeable batteries which are currently under development and consideration can be classified into two types: natural graphite particles and artificial graphite particles.

As the natural graphite particles, massive natural graphite can be cited which is prepared by transforming flake particles into massive (spherical) particles in a pulverizing step of raw ore or other steps (Japanese Laid-Open Patent Publication No. Hei 11-263612).

Further, the following can be cited as the artificial graphite particles: a material prepared by graphitizing some sort of coke, and a material prepared by graphitizing granulated particles made of a coke and various sorts of pitch etc. (Japanese Laid-Open Patent Publication No. Hei 6-310142, Japanese Laid-Open Patent Publication No. Hei 10-188959), and special artificial graphite particles utilizing mesophase carbon (sort of liquid crystal) produced by heating pitch or tar.

As the special artificial graphite particles, mainly used ones may include: (1) a material prepared by carbonizing and graphitizing mesophase spherules having been separated and extracted from mesophase pitch (graphitized MCMB) (Japanese Laid-Open Patent Publication No. Hei 4-190555, Japanese Laid-Open Patent Publication No. Hei 5-307958); (2) a material prepared such that mesophase pitch in a fused state, which generates in the polymerization-growth process of mesophase spherules, is spun into fiber, and after the obtained fiber is made infusible through surface oxidation, it is carbonized and then cut and pulverized to be graphitized (graphitized milled MCF (mesophase pitch based carbon fiber)) (Japanese Laid-Open Patent Publication No. Hei 9-63584); and (3) a material prepared such that pulverized particles of bulk mesophase pitch with low fusibility, having generated in the polymerization-growth process of mesophase spherules, is carbonized and graphitized (graphitized bulk mesophase) (Japanese Laid-Open Patent Publication No. Hei 9-251855, Japanese Patent No. 3309701 Specification, Japanese Laid-Open Patent Publication No. Hei 9-259886).

As for the natural graphite particles, a reversible capacity close on the theoretical capacity of graphite of 372 mAh/g has been obtained. In this regard, there have been accumulated techniques for adjusting a form of particles to make them suitable for high density filling (Japanese Laid-Open Patent Publication No. Hei 11-54123), for example, in response to a recent demand for a higher energy density of lithium-ion rechargeable batteries. Further actively considered has been reduction in irreversible capacity that occurs through electrolyte decomoposition on the surface of graphite particles at the initial stage of charging, by covering an edge face exposed to the graphite particle surface with amorphous carbon classified as graphitizable carbon.

In the case of the artificial graphite, on the other hand, a reversible capacity close to the theoretical capacity of graphite cannot be obtained at the present time. Since the artificial graphite has a reversible capacity smaller than that of the natural graphite, studies are underway on increasing purities of cokes, pitch and tar as raw materials, and also on raising a graphitization level of particles to improve a reversible capacity by making conditions for graphitization appropriate according to materials, by adding a catalyst species for promoting graphitization to the material, or by some other methods. It should be noted that, in such artificial graphite, the ratio of the graphite edge face exposed to the particle surface is small and the irreversible capacity at the initial stage of charging is generally smaller than that of the natural graphite.

In actual production of a negative electrode of a lithium-ion rechargeable battery, such graphite species as described above is adjusted to have an average particle size in the range of 5 μm to tens of μm before being used. There are some cases where one sort of the above graphite species is singly used as an active material, and there is another case where two sorts or more of the above graphite species are mixed and then used as an active material. In general, an aqueous paste or an organic paste is prepared and then applied onto a negative electrode current collector, such as a copper foil. The applied paste is dried so that a negative electrode material mixture layer is formed to serve as a negative electrode plate with the current collector. The negative electrode material mixture layer is rolled by pressure to have a prescribed thickness (density). Subsequently, the negative electrode plate is cut, processed, and then subjected to such a process as lead-welding to the exposed part of the current collector.

The aqueous paste is prepared by adding adequate amounts of water, SBR (styrene-butadiene copolymer rubber) or the like as a binder, and CMC (carboxymethyl cellulose) or the like as a thickener, respectively, in active material particles comprising graphite. Further, the organic paste is prepared by adding adequate amounts of PVDF (polyvinylidene fluoride) or the like as a binder/thickener and NMP (N-methyl-2-pyrrolidone) or the like as a dispersion medium, respectively, in active material particles comprising graphite.

It is often the case that the upper limit of the density of the negative electrode material mixture layer is set to about 1.7 $g/cm^3$, to prevent crush (collapse) of active material particles, which occurs during the rolling by pressure, and to prevent drop or separation of particles from the current collector. In such a manner that the aforementioned negative electrode, a positive electrode rolled by pressure in the same manner as with the negative electrode, and a polyolefin-made microporous separator having an adequate porosity and mechanical strength, are combined to assemble a lithium-ion rechargeable battery, it has become possible to obtain a volume energy density exceeding 350 Wh/L Meanwhile, there has hitherto been a problem with a lithium-ion rechargeable battery using a negative electrode comprising such graphite as above described: a problem of capacity deterioration in the course of charge/discharge cycles. Herein, deterioration in cycle life characteristic attributable to a negative electrode comprising graphite can be understood from the following aspect:

With repetition of intercalating/deintercalating lithium ions to and from the spacing between graphite layers (expansion and shrinkage of graphite particles) during charge/discharge cycles, the following problem may arise.

First, graphite particles crack or collapse and a newly formed edge face of the graphite is exposed to an electrolyte, causing consumption by decomposition of the electrolyte to increase internal resistance of a battery (deterioration mode 1). Further, the graphite particles float from the current collector and a negative electrode material mixture swells. As a result, performance of collecting current between the graphite particles becomes deficient, and some of the graphite particles are left isolated within a material mixture layer and cannot contribute to charge/discharge reactions. This can also be one of the major causes of the capacity deterioration. (deterioration mode 2).

Due to swelling (expansion) of an electrode, an electrode plate assembly comprising a positive electrode and a negative electrode deforms or breaks to cause the capacity deterioration (deterioration mode 3). Further, a gas produced by the electrolyte decomposition causes the battery internal pressure to increase, leading to the capacity deterioration according to deformation of a case (deterioration mode 4).

Herein, in response to the deterioration caused by the electrolyte decomposition on the graphite particles as in the deterioration modes 1 and 4, there have recently been conducted intensive studies including a study on application of a negative electrode protection additive, such as vinylene carbonate (VC), into an electrolyte (Japanese Laid-Open Patent Publication No. Hei 8-45545, Japanese Laid-Open Patent Publication No. 2002-25612) [measure 1]. VC reacts preferentially with graphite in the negative electrode at the first stage of charging/discharging, to form a protective film on the graphite particles so as to prevent the decomposition reaction from occurring between the graphite and the electrolyte due to cycles.

In response to the deterioration mode 2, there have hitherto been proposed methods [measure 2] for reducing the isolated particles within the material mixture layer by adding a conductive additive for current collection to graphite as a main active material. The methods include: addition of carbon fiber to graphitized MCMB or the like (Japanese Laid-Open Patent Publication No. Hei 4-237971, Japanese Laid-Open Patent Publication No. Hei 4-155776), addition of carbon black or the like, which is non-graphitized carbon having a chain structure to graphitized MCMB or the like (Japanese Laid-Open Patent Publication No. Hei 4-332465), addition of flake graphite to graphitized MCMB or the like (Japanese Laid-Open Patent Publication No. 2000-138061), and addition of a low-crystalline coke to natural graphite (Japanese Laid-Open Patent Publication No. Hei 8-264181).

In response to the deterioration mode 3, it is effective to use a negative electrode material with a low level of swelling, namely particles with relatively high isotropy of a graphite structure. Among those described above, preferably used ones may include the material obtained by graphitizing granulated particles made of a coke and various sorts of pitch, or the like, graphitized MCMB, and graphitized milled MCF.

In using graphite particles with large anisotropy, such as natural graphite particles represented by flake graphite, it is essential to mechanically transform flake particles into spherical ones, or perform other treatments (Japanese Laid-Open Patent Publication No. Hei 11-263612) [measure 3].

It should be noted that application of carbon nano-tubes, in place of graphite, as a main active material of a negative electrode of a lithium-ion rechargeable battery, has already been under review (Japanese Laid-Open Patent Publication No. Hei 5-159804, Japanese Laid-Open Patent Publication No. Hei 7-14573). However, there has been found no example of studies on the use of carbon nano-tubes as a conductive additive in terms of improving a cycle life characteristic.

As thus described, although various measures (the measures 1 to 3) have been taken toward lithium-ion rechargeable batteries with the aim of improving cycle life characteristics thereof, it is hard to say that cycle life characteristics of lithium-ion rechargeable batteries have reached a sufficient level. In particular, the method of adding a conductive additive to graphite, as shown in the measure 2, leaves much to be improved.

BRIEF SUMMARY OF THE INVENTION

In view of what was described above, the present invention is directed to addition of carbon nano-tubes as a conductive additive to an active material comprising graphite so that a cycle life characteristic of a lithium-ion rechargeable battery can further be improved.

The present invention is also directed to control of the respective physical properties of graphite and carbon nano-tubes to be prescribed values so that an appropriate porosity in the negative electrode material mixture layer is achieved where an electrolyte is easily impregnated, while favorable contact is maintained between the particles within the negative electrode material mixture layer, and it is thereby possible to obtain an excellent discharge rate characteristic and pulse discharge characteristic.

The present invention relates to a lithium-ion rechargeable battery, comprising a positive electrode capable of absorbing and desorbing lithium ions, a negative electrode capable of absorbing and desorbing lithium ions, a separator interposed between the positive electrode and the negative electrode, and a non-aqueous electrolyte, wherein the negative electrode comprises a negative electrode current collector and a negative electrode material mixture layer carried on the negative electrode current collector, the negative electrode material mixture layer comprises graphite and carbon nano-tubes, and an amount of the carbon nano-tubes in the negative electrode material mixture layer is not smaller than 0.1 part by weight and not larger than 10 parts by weight, per 100 parts by weight of the graphite.

It is preferable that the negative electrode material mixture layer have a density of not smaller than 1.4 g/cm$^3$ and not larger than 1.8 g/cm$^3$.

It is preferable that the carbon nano-tubes have a multi-wall structure, an average fiber diameter of the carbon nano-tubes be 10 nm or larger, and an average fiber length of the carbon nano-tubes be 1 μm or larger.

It is preferable that the graphite have the following physical properties: (1) a spacing $d_{002}$ between (002) crystal faces, obtained by a powder X-ray diffraction measurement, is 3.365 Å or less; (2) an average particle size, obtained by a laser diffraction-type particle size distribution measurement, is not smaller than 5 μm and not larger than 25 μm; (3) a BET specific surface area is 5 m$^2$/g or smaller; and (4) an average particle circularity is 0.85 or larger.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The lithium-ion rechargeable battery in accordance with the present invention comprises a negative electrode, comprising a negative electrode current collector and a negative electrode material mixture layer carried on the negative electrode current collector. The negative electrode material mixture layer comprises graphite as active material particles and carbon nano-tubes as a conductive additive. An amount of the carbon nano-tubes contained in the negative electrode material mixture layer is not smaller than 0.1 part by weight and not larger than 10 parts by weight, per 100 parts by weight of the graphite.

Carbon nano-tubes are a material discovered by Ijima et al. in 1991, and an extremely fine carbon material having a fiber structure in which a graphitic face (graphene sheet) is cylindrically round and the fiber diameter thereof is in nanometer-order. With the recent research and development of producing carbon nano-tubes, other than the production method utilizing arc discharge, initially used at the time of the discovery thereof, a number of production methods have been developed and proposed, the methods including laser abrasion, vapor-phase CVD, pyrolysis CVD, and chemical synthesis using a catalyst. It has been becoming possible to mass-produce, at relatively low cost, single-wall carbon nano-tubes (SWCNT) as well as multi-wall carbon nano-tubes (MWCNT) having various diameters and lengths.

When an amount of the carbon nano-tubes added is below 0.1 part by weight per 100 parts by weight of the graphite, it is not possible to obtain a sufficient effect of improving a cycle life characteristic of a lithium-ion rechargeable battery. On the contrary, when an amount of the carbon nano-tubes added exceeds 10 parts by weight per 100 parts by weight of the graphite, the carbon nano-tubes become so bulky as to make it difficult to form a solid negative electrode material mixture layer, and the sufficient effect of improving a cycle life characteristic cannot be obtained. Further, an irreversible capacity of the negative electrode derived from the carbon nano-tubes increases.

In the present invention, it is preferable that the negative electrode material mixture layer have a density of not smaller than 1.4 g/cm$^3$ and not larger than 1.8 g/cm$^3$. In a lithium-ion rechargeable battery comprising such a negative electrode, even when the phenomenon occurs that graphite particles as an active material float from the current collector and the negative electrode material mixture swells, the carbon nano-tubes as a conductive additive tightly bond graphite particles to secure current collection, whereby isolation of graphite particles (particles not contributable to charge/discharge reactions) becomes harder to occur within the material mixture layer. Accordingly, a lithium-ion rechargeable battery having a further excellent cycle life characteristic can be obtained.

Herein, the density of the negative electrode material mixture layer refers to a density obtained with a binder and the like included, and expressed by a weight of the negative electrode material mixture layer per unit volume. With the density of the negative electrode material mixture layer being below 1.4 g/cm$^3$, it becomes difficult to make the carbon nano-tubes bond the graphite particles in an electrically favorable manner, namely it becomes difficult to make the added carbon nano-tubes effectively function as a material for a conductive network in the negative electrode. On the other hand, with the density of the negative electrode material mixture layer being over 1.8 g/cm$^3$, the porosity of the negative electrode material mixture layer becomes so low that the electrolyte cannot be sufficiently impregnated into the electrode plate, thereby making it difficult to secure a favorable discharge rate characteristic and a favorable pulse discharge characteristic.

In the present invention, it is also preferable that carbon nano-tubes with the fiber diameter and fiber length respectively adjusted to favorable ranges be combined with graphite particles with the average particle size and average particle circularity, etc. respectively adjusted to the favorable ranges. This combination enables the contact between the particles to be preferably kept, and also enables an appropriate porosity, with which the electrolyte can be easily impregnated into the negative electrode material mixture layer, to be achieved, resulting in that an excellent discharge rate characteristic as well as an excellent pulse discharge characteristic can be imparted to a battery.

In a negative electrode of a lithium-ion rechargeable battery, it is often the case that graphite particles with the average particle size thereof adjusted to the range of about 5 μm to tens of μm are used as a main active material. When carbon nano-tubes are used as the conductive additive for electrically connecting the particles, therefore, carbon nano-tubes with relatively high electronic conductivity, a large fiber diameter and a large fiber length are preferably used.

It is therefore preferable that, in the present invention, high-crystalline carbon nano-tubes having a multi-wall structure (MWCNT) be used.

It is further preferable that an average fiber diameter of the carbon nano-tubes is 10 nm or larger, and an average fiber length thereof is 1 μm or larger. When the average fiber diameter of the carbon nano-tubes is below 10 nm, plural fibers condense, and high dispersion of the carbon nano-tubes in the negative electrode material mixture becomes difficult; when the average fiber length of the carbon nano-tubes is smaller than 1 μm, the electrical connection between the graphite particles by the carbon nano-tubes becomes difficult.

However, industrial production of carbon nano-tubes, with an average fiber diameter exceeding 50 nm or an average fiber length exceeding 5 μm, is difficult and even if such carbon nano-tubes are industrially produced, an irreversible capacity deprived from the carbon nano-tubes is supposed to become large. Therefore, carbon nano-tubes with an average fiber diameter of 50 nm or smaller and an average fiber length of 5 μm or smaller is suited for the present invention.

It is to be noted that the ends of each of the carbon nano-tubes may be either open or close. An average fiber diameter and an average fiber length of carbon nano-tubes can be obtained for example by observation of a TEM image and an SEM image of the carbon nano-tubes.

A spacing $d_{002}$ between (002) crystal faces of graphite to be used as a main active material, which is determined by a powder X-ray diffraction method, is preferably 3.365 Å or less. This is because a high reversible capacity can be obtained by the use of graphite with the crystallinity thereof sufficiently increased until the spacing $d_{002}$ between the (002) crystal faces becomes 3.365 Å or less.

Herein, the $d_{002}$ can be specifically estimated in conformity with the estimation method regulated by the 117th committee in Japan Society for the Promotion of Science. Namely, high-purity crystalline silicon as an internal standard is added to a sample of a graphite powder, and is subjected to a powder X-ray diffraction measurement. By correcting a position of a peak attributed to the (002) crystal face of graphite, based on the silicon peak, an accurate $d_{002}$ can be calculated.

It is further preferable that an average particle size ($D_{50}$ on the volume basis), obtained by a laser diffraction-type particle size distribution measurement, be not smaller than 5 μm and not larger than 25 μm. When the average particle size of the graphite particles exceeds 25 μm, it is difficult for carbon nano-tubes with a short fiber length of about 1 μm to effectively function for securing the connection between the particles. In order to obtain the graphite particles with the average particle size of smaller than 5 μm, it is necessary to remove a coarse powder by powerful classification in the production of the graphite particles. Considering the yield of active material particles, virtual cost becomes quite high.

In the present invention, an irreversible capacity of the negative electrode at the initial stage of charging/discharging is constituted by an irreversible capacity derived from the graphite particles and an irreversible capacity derived from the carbon nano-tubes. In general, carbon nano-tubes of MWCNT with the tube ends thereof in an open state have a large irreversible capacity of about 150 mAh/g to 300 mAh/g, although the capacity defers depending on the structures, fiber lengths, or the like, of the carbon nano-tubes. This necessitates control of the irreversible capacity of the graphite particles as small as possible. Although there are various sorts of parameters for determining an amount of the irreversible capacity of the graphite particles, it is known that the irreversible capacity has relatively high correlation with a BET specific surface area. There are many cases where, the smaller the BET specific surface area, the smaller the initial irreversible capacity becomes. As thus described, in the present invention, it is desirable to use, as active material particles, graphite with the BET specific surface area thereof reduced to 5 $m^2$/g or smaller and the initial irreversible capacity thereof sufficiently reduced.

Further, in rolling by pressure the negative electrode material mixture layer, in order to avoid a phenomenon that graphite particles are oriented along the plane of the current collector to cause deterioration in discharge characteristic etc., it is preferable that spherical graphite particles be used and that an average particle circularity of the graphite particles be 0.85 or more. It is to be noted that the particle circularity is expressed by a ratio (Lc/Lr) of a perimeter (Lc) of a corresponding circle having the same area as that of a particle projection image to a perimeter (Lr) of the particle projection image.

Herein, the particle circularity is usually calculated by a particle image projected to a two-dimensional plane. One of examples of such calculation is described below.

In picking up a particle image, first, a slurry containing particles is sucked into a measurement device, and led by a plain cell to from a plain sample flow. By irradiating the sample flow with a strobe light, an image of the particles flowing in the cell is picked up through an objective lens of a CCD camera, as a static image. The particles in the sample flow are hydrodynamically controlled so as to flow through the center of the cell, and an image of the particles in focus is always picked up. The particle images picked up are usually analyzed in real time. Using the areas and the perimeters of the respective picked-up particle projection image, a corresponding circle diameter and a particle circularity are determined.

The sample flow is irradiated with a strobe light for example in about every 1/30 seconds, and images of particles present in a camera flame are picked up. After a certain number of images are picked up, the number of the particles contained in the sample flow per unit volume is quantitatively calculated from the number of the particle images, a cell thickness, a flame size, and the like. Herewith, the average particle circularity etc. can be calculated on a numeral quantity basis. Further, a particle size distribution etc. can be calculated either on a numeral quantity basis or a volume basis.

In order to determine the particle circularity, first, the picked-up particle projection images are classified by size. Each of the particle projection images is divided, for example, into 512×512 pixels, and each of the pixels is binarized. Subsequently, a corresponding circle, having the same projection area as that of the particle projection image, and the perimeter (Lc) thereof are determined. Further, a length of an outline of the particle projection image obtained by connecting a center of each of the pixels constituting the outermost periphery of the particle projection image is determined as a perimeter (Lr) of the particle projection image. An average of the Lc/Lr ratio of the particles (e.g. 100 particles or more) whose images have been picked up can be defined as the average particle circularity.

It should be noted that, although a particle circularity slightly varies depending on a scaling factor of particle projection images or a number of pixels, it can be considered that a difference in device does not cause a substantial difference in average particle circularity, as long as a commercially manufactured device for analyzing images of particles is used.

In the following, the present invention is specifically described based on examples.

EXAMPLE 1

(i) Production of Negative Electrode

As the main active material of the negative electrode, covered natural graphite particles obtained by the following procedure were used.

First, raw ore of natural graphite produced in Sri Lanka was ground with a mill into flake natural graphite with an average particle size $D_{50}$ of 21 μm, washed with hydrofluoric acid for removal of impurity (ash), and then dried. The resultant flake natural graphite particles were transformed into a spherical shape by means of the hybridization system, in which shock or shearing force was applied to the particle surface under high-speed revolution, and also air-classified.

100 parts by weight of the obtained spherical natural graphite particles were kneaded by a mixer with 5 parts by weight of petroleum pitch in a liquid state at room temperature. The resultant mixture was heated in a baking furnace at 1300° C., and the pitch which adhered to the graphite particle surface was carbonized, and then crushed and classified to give covered natural graphite particles.

As for the resultant covered natural graphite particles, the spacing $d_{002}$, obtained by a powder X-ray diffraction measurement, was 3.359 Å; the average particle size $D_{50}$, obtained by a laser diffraction-type particle size distribution measuring instrument, was 20 μm; the BET specific surface area was 3.0 m²/g; and the average particle circularity was 0.91.

As for the carbon nano-tubes as the conductive additive, multi-wall carbon nano-tubes (MWCNT) with high crystallinity was used. The carbon nano-tubes were obtained by a heat CVD method where hydrocarbon was pyrolytically decomposed by the use of an iron-group catalyst. From the observation of the TEM image and the SEM image of the carbon nano-tubes, it was found that the carbon nano-tubes had an average fiber diameter of about 20 nm, and the structure thereof was constituted by about 8 to 10 layers. An average fiber length of the carbon nano-tubes was about 1 μm. The aforementioned covered natural graphite was blended with the carbon nano-tubes in a ratio as shown in Table 1, and then mixed well with a dry speed mixer, to give negative electrode carbon materials "a" to "h".

TABLE 1

| Kind of negative electrode carbon material | Blend ratio (Weight ratio) | |
|---|---|---|
| | Covered natural graphite | Carbon nano-tubes |
| a | 100 | 0.1 |
| b | 100 | 0.5 |
| c | 100 | 1 |
| d | 100 | 5 |
| e | 100 | 7 |
| f | 100 | 10 |
| g | 100 | 12 |
| h | 100 | 0 |

Subsequently, 100 parts by weight of the negative electrode carbon material "a" was added with 100 parts by weight of a 1-wt %-carboxymethyl cellulose (CMC) aqueous solution and an aqueous dispersion of styrene butadiene rubber (SBR) as a binder, and then kneaded well to prepare a negative electrode material mixture paste. Herein, an amount of SBR added was 2 parts by weight per 100 parts by weight of the negative electrode carbon material "a".

The obtained negative electrode material mixture paste was applied onto each face of a copper foil (thickness: 10 μm) with a coating machine to have a certain thickness, and then dried with hot air at 100%, to form a negative electrode material mixture layer. Thereafter, the negative electrode material mixture layer was rolled by pressure with a roll press such that the material mixture layer had a density, which was obtained including weights of CMC and SBR, of 1.7 g/cm³ and a thickness of 70 μm (thickness of the entire electrode: about 150 μm). This was cut into a prescribed size, processed, and then got equipped with leads for current collection, to give a negative electrode A.

Further, in the same conditions as above except for the use of the negative electrode carbon materials "b" to "h", negative electrodes B to H, including the negative electrode carbon materials "b" to "h", were respectively fabricated.

Moreover, conductive additives other than carbon nano-tubes, i.e. graphitized material of vapor grown carbon fiber (VGCF) (manufactured by Showa Denko K. K) as a representative of micro-fiber graphite, acetylene black (manufactured by Denki Kagaku Kogyo K. K.) as a representative of carbon black, and artificial graphite "KS4" (manufactured by TIMCAL Graphite & Carbon Inc.) as a representative of flake graphite were prepared. Those conductive additives and the covered natural graphite were blended in such ratios as shown in Table 2, and then mixed well with a dry speed mixer to obtain negative electrode carbon materials "i" to "k" for comparison. In the same conditions as above except for the use of the negative electrode carbon materials "i" to "k", negative electrodes I to K, including the negative electrode carbon materials "i" to "k", were respectively produced.

TABLE 2

| Kind of negative electrode carbon material | Kind of conductive additive | Blend ratio (Weight ratio) | |
|---|---|---|---|
| | | Covered natural graphite | Conductive Additive |
| i | VGCF graphitized material | 100 | 5 |
| j | Acetylene black | 100 | 5 |
| k | Flake graphite(KS4) | 100 | 5 |

(ii) Production of Positive Electrode

A mixture of $CO_3O_4$ and $Li_2CO_3$ was baked in an air atmosphere at 950° C., whereafter the mixture was crushed and the particle size thereof was adjusted to produce $LiCoO_2$ to be used as the positive electrode active material.

In producing the positive electrode plate, 100 parts by weight of the positive electrode active material was added with 3 parts by weight of acetylene black (AB) as a conductive agent, and then mixed well in a dry mixer. This was added with 5 parts by weight of polyvinylidene fluoride (PVDF) as a binder and, while being added with N-methyl-2-pyrrolidone (NMP) as appropriate, the mixture was kneaded to prepare a positive electrode material mixture paste.

The obtained positive electrode material mixture paste was applied onto each face of an aluminum foil (thickness: 20 μm) with a coating machine to have a certain thickness, and then dried with dry air at 100° C., to form a positive electrode material mixture layer. Thereafter, the positive electrode material mixture layer was rolled by pressure with a roll press such that the material mixture layer had a density, which was obtained including weights of AB and PVDF, of 3.5 g/cm³ and a thickness of 70 μm (thickness of the entire electrode: about 160 μm). This was cut into a prescribed size, processed, and then got equipped with aluminum-made leads for current collection, to give a positive electrode.

(iii) Fabrication of Lithium-Ion Rechargeable Battery

The negative electrode A and the positive electrode, produced in the aforementioned procedures, were respectively vacuum-dried at 100° C. for eight hours, for the purpose of removing extra water. Further, a polyethylene-made porous film separator (thickness: 25 μm) for physically completely separating the two electrodes was vacuum-dried at 50° C. for 12 hours.

Figure 1:
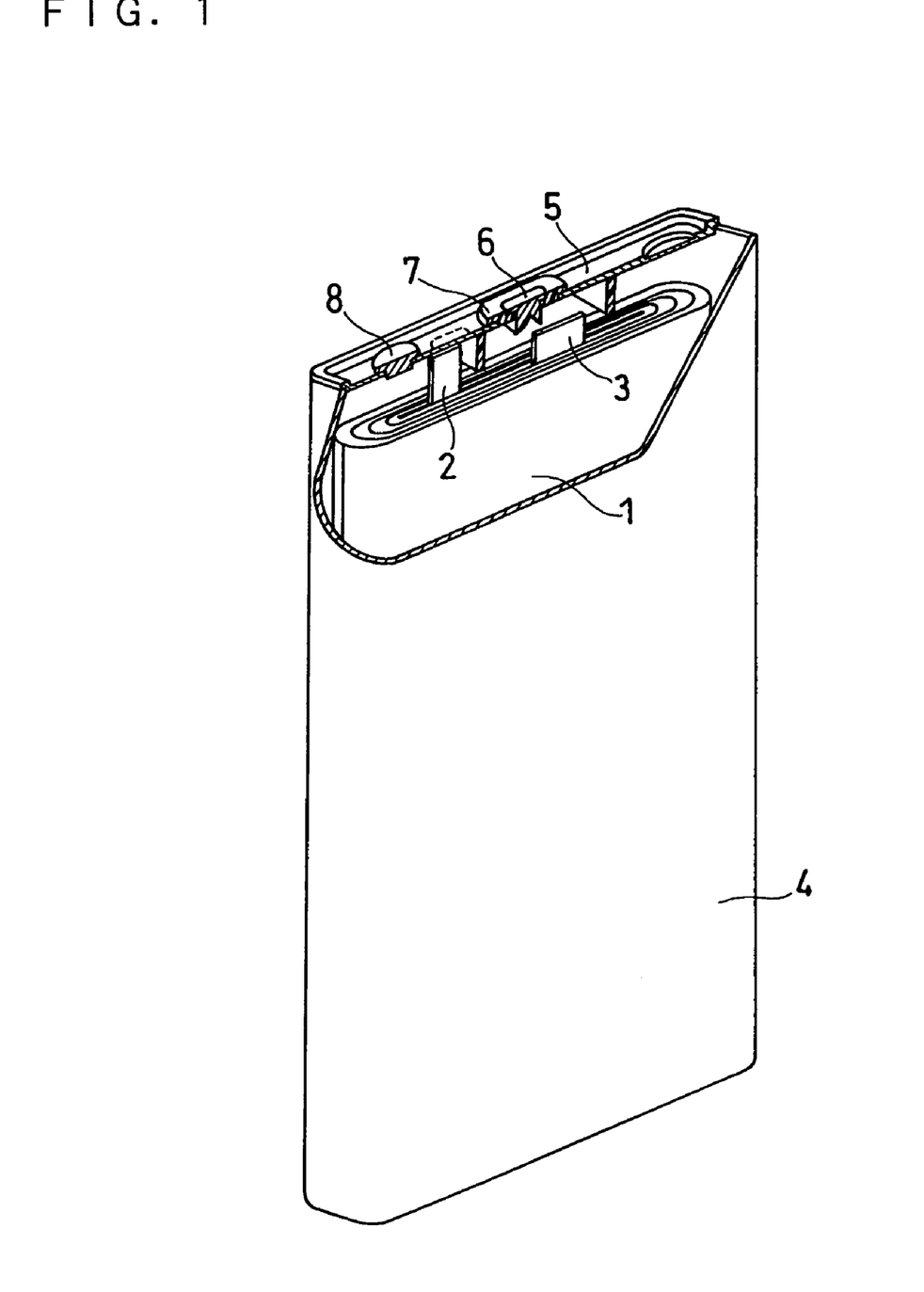
FIG. 1 is a partially cutaway oblique view of a lithium-ion rechargeable battery fabricated in Examples.

Subsequently, the negative electrode A and the positive electrode were wound up with the separator interposed therebetween to form an electrode plate assembly 1 in the shape of a substantially quadratic prism (the cross section thereof was almost in rectangular shape), as shown in FIG. 1. The electrode plate assembly 1 was housed into a prismatic battery case 4, made of aluminum alloy, of 533048 size (thickness of 5.3 mm×width of 30 mm×height of 48 mm). The positive electrode lead 2 was welded to an inner face of a sealing plate 5. Further, the negative electrode lead 3 was welded to a negative electrode terminal 6 electrically completely separated from the sealing plate by an insulating gasket 7. Thereafter, the open ends of the battery case 4 and the sealing plate 5 were bonded to each other by laser welding. A non-aqueous electrolyte was injected from an inlet provided in the sealing plate 5, and vacuum-impregnated in the electrode plate assembly 1.

With the inlet kept open, the battery was subjected to a first partial charge. At that time, a gas that generated due to occurrence of the electrolyte decomposition according to the film formation on the negative electrode, or the like, was dispersed and removed well. Thereafter, the inlet was closed with a sealing stopper 8 made of aluminum alloy, and the sealing stopper 8 was bonded to the periphery of the inlet by laser welding to completely seal the case so that a lithium-ion rechargeable battery A (design capacity: 750 mAh), comprising the negative electrode A, was completed.

Further, in the same conditions as above except for the use of the negative electrodes B to K in place of the negative electrode A, lithium-ion rechargeable batteries B to K, comprising the negative electrodes B to K, were respectively fabricated. Herein, the steps of constituting the electrode plate assembly, welding the positive/negative electrode leads, bonding the sealing plate to the case, injecting and impregnating the electrolyte, conducting the first partial charge, and tightly sealing the case with the sealing stopper, were all conducted in a dry air atmosphere with a dew point of −40° C. or lower. Further, the first partial charge was conducted at a charging rate of 0.1 C (75 mA, assuming 1 C=750 mA) in an atmosphere at 20° C. for two hours.

As the non-aqueous electrolyte used was a solution obtained by dissolving $LiPF_6$ in a mixed solvent of ethylene carbonate (EC), ethyl methyl carbonate (EMC) and diethyl carbonate (DEC) in a volume ratio of 1:2:1 such that the concentration of $LiPF_6$ was 1.0 M. 1 wt % of VC (vinylene carbonate) as a negative electrode protection additive was also added to the non-aqueous electrolyte.

(iv) Evaluation of Battery Characteristics

First, 11 kinds of lithium-ion rechargeable batteries, fabricated above, went through five cycles of charge/discharge in below-listed conditions to be activated well.
  Charging: Constant-current constant-voltage system
  Constant current, 0.2 C (150 mA)
  Charge terminating voltage, 4.2 V
  Total charge time, 7 hours
  Discharging:
  Constant current, 0.2 C (150 mA)
  Discharge cut voltage, 3.0 V
  Atmosphere temperature: 20° C.

[Cycle Life Characteristic]

Because the present invention is intent mainly on improving a cycle life characteristic, a test of repeating charge/discharge cycles in the following conditions was conducted to determine a capacity retention ratio (battery capacity in percentages on the assumption that the capacity at the first cycle was 100%) at every 50 cycles.
  Charging: Constant-current constant-voltage system
  Constant current, 0.7 C (525 mA)
  Charge terminating voltage, 4.2 V
  Total charge time, 2.5 hours
  Interval after charging: 30 minutes
  Discharging:
  Constant current, 0.7 C (525 mA)
  Discharge cut voltage, 3.0 V
  Interval after discharging: 30 minutes
  Atmosphere temperature in evaluation: 20° C.

Figure 2:
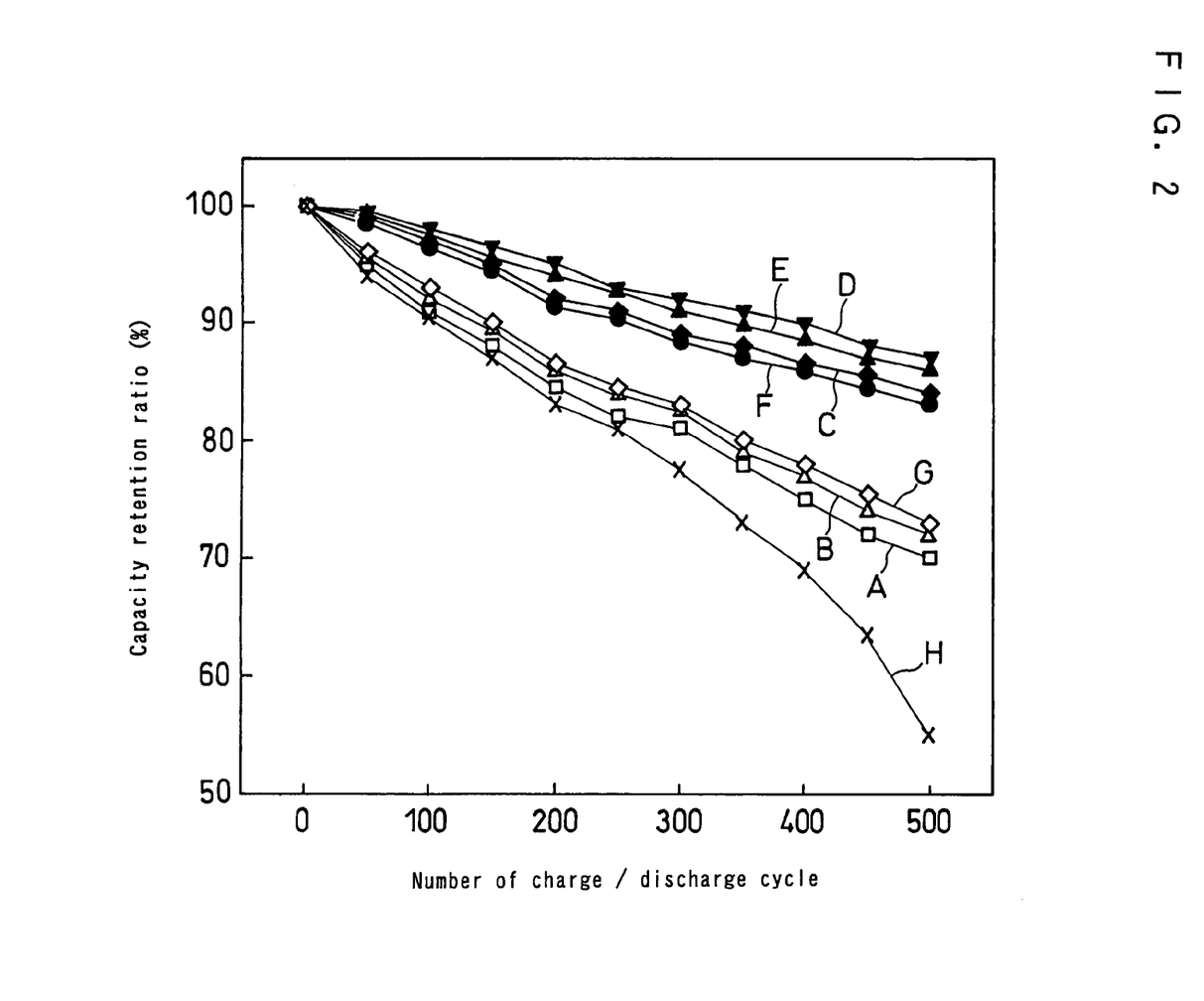
FIG. 2 is a graph showing the relationship between the number of charge/discharge cycles and the capacity retention ratio in the case of varying an amount of carbon nano-tubes added.
Figure 3:
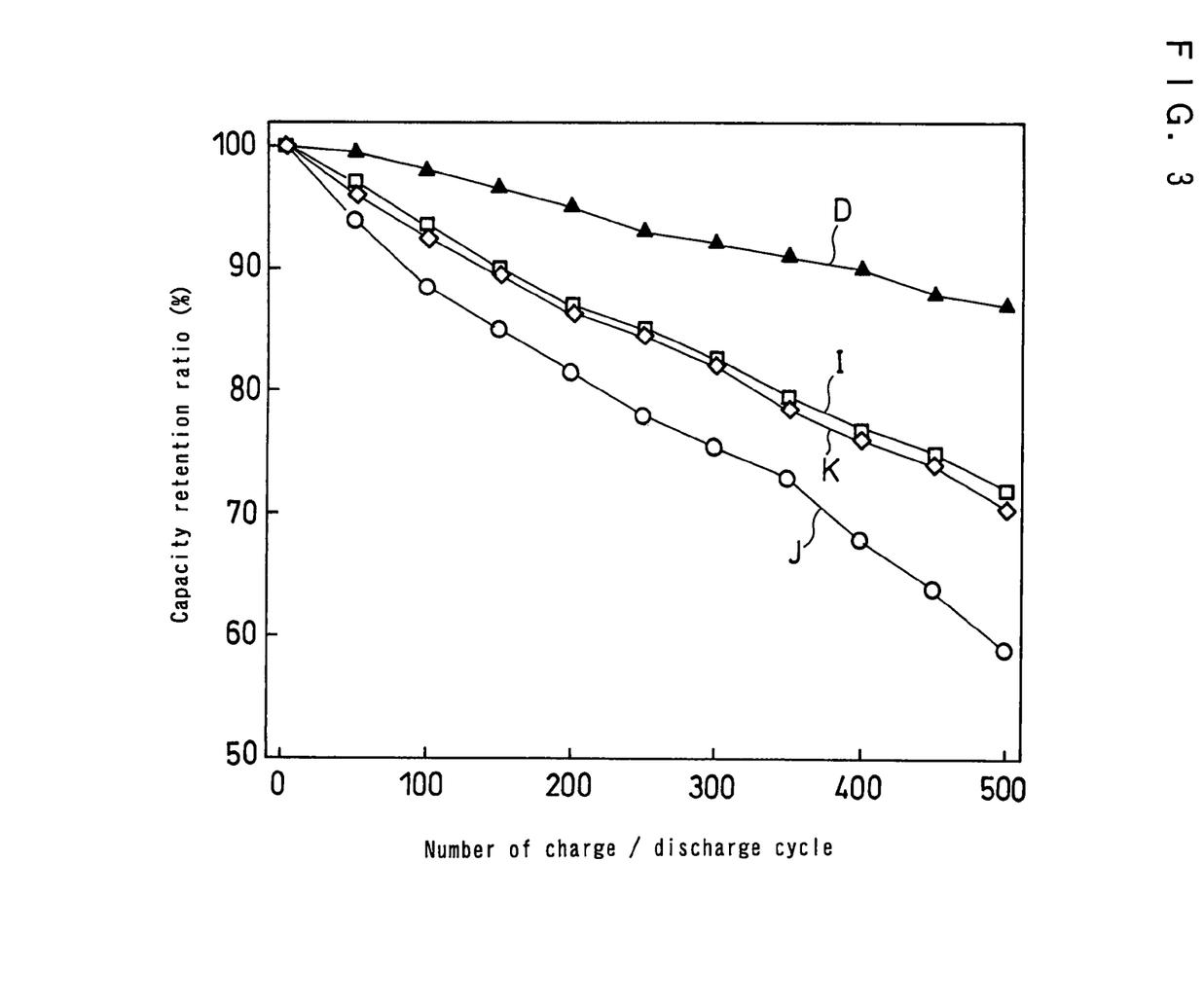
FIG. 3 is a graph showing the relationship between the number of charge/discharge cycles and the capacity retention ratio in the case of changing the sort of conductive additive in a negative electrode.

The obtained results are put together and shown in FIGS. 2 and 3.

It is found from FIG. 2 that the batteries C, D, E and F of the present invention have higher capacity retention ratios, compared with the battery H including no conductive additive and the battery G with an excessive amount of 12 parts by weight of carbon nano-tubes added as the conductive additive. Although the batteries A and B, with extremely low amounts of 0.1 part by weight and 0.5 parts by weight, respectively, of carbon nano-tubes added as the conductive additive, have rather low capacity ratios, those batteries are found to be improved noticeably in comparison with the battery H including no conductive additive.

Herein, in none of the batteries A to H, a significant increase in battery internal resistance, swelling of a battery case, or the like, was observed at 500th cycle. In the light of the aforementioned cycle deterioration modes 1 to 4, it is thought that a capacity of each of the batteries A to H has decreased due mainly to the deterioration mode 2. Namely, it is considered that an amount of graphite particles left isolated in the material mixture layer (particles not contributable to charge/discharge reactions) due to deficient current collectivity between the graphite particles, increases with cycles, leading to the capacity deterioration. Accordingly, the batteries C, D, E and F of the present invention were able to keep the high capacity retention ratios presumably because the carbon nano-tubes as the conductive additive closely bonded the covered graphite particles to secure current collection and inhibit accumulation of the covered graphite particles left isolated in the material mixture layer throughout the overall cycles.

In the batteries A and B with small amounts of carbon nano-tubes added thereto, such an effect as above described is not sufficiently shown, and a certain degree of capacity deterioration is thought to have occurred. Further, in the battery G with an excessive amount of 12 parts by weight of the carbon nano-tubes added, the capacity deteriorated presumably because the carbon nano-tubes were bulky, or for some other reason. That is to say, it is thought that, when an amount of the carbon nano-tubes is excessively large, a physically solid negative electrode material mixture layer cannot be formed, and such a phenomenon may thus occur as the negative electrode material mixture is partially separated from the current collector and part of the separated material mixture may cause clogging of the separator in the course of the cycles. It can be said from the above results that an amount of the carbon nano-tubes to be added per 100 parts by weight of graphite is preferably set to not smaller than 1 part by weight and not larger than 10 parts by weight, while the effect of adding the carbon nano-tubes may still be recognized by the addition of 0.1 part by weight of the carbon nano-tubes.

It is further found from FIG. 3 that, rather than in the case of using the VGCF graphitized material, acetylene black (AB), flake graphite or the like, which are known as conductive additives having the effect of improving a cycle life characteristic of a negative electrode, the improvement effect is larger in the case of using the carbon nano-tubes as the conductive additive. This is presumably because, in the negative electrode of the battery in the present example, carbon nano-tubes having a fiber length of about 1 μm and a fiber diameter far smaller than those of the VGCF graphitized material, acetylene black and the like, was used as the conductive additive. The covered natural graphite particles used as the main active material has an average particle size of 20 µm whereas the carbon nano-tubes have an extremely small fiber diameter. Hence, it is supposed that the active material particles are bonded by a large number of the fibers so that a more precise conductive network can be formed, and the effect of improving a cycle life characteristic is enhanced more than in the case of using the conventional conductive additive.

[Discharge Rate Characteristic]

11 kinds of batteries A to K, having gone through the first five cycles of charge/discharge (having been activated), were subjected to charging/discharging in the following conditions to determine a ratio (%) of 2 C discharge capacity to 0.2 C discharge capacity (standard capacity), and the obtained value was evaluated as a discharge rate characteristic. The evaluation results of the discharge rate characteristic are shown in Table 3.

Charging: Constant-current constant-voltage system
Constant current, 0.2 C (150 mA)
Charge terminating voltage, 4.2 V
Total charge time, 7 hours
Interval after charging: 60 minutes
Discharging:
Constant current, 0.2 C (150 mA) and 2 C (1500 mA)
Discharge cut voltage, 3.0 V
Atmosphere temperature: 20° C.

TABLE 3

| Battery | Discharge rate characteristic (%) (2 C/0.2 C discharge capacity ratio) |
|---|---|
| A | 82 |
| B | 87 |
| C | 90 |
| D | 93 |
| E | 92 |
| F | 90 |
| G | 86 |
| H | 79 |
| I | 84 |
| J | 82 |
| K | 84 |

It is found from Table 3 that the tendency of the discharge rate characteristic almost agrees with the aforementioned tendency of the cycle life characteristic. Especially in each of the batteries C, D, E and F, the blend ratio of the carbon nano-tubes, the fiber diameter and the fiber length of the carbon nano-tubes, the average particle size and the average circularity of the graphite particles, and the density of the negative electrode material mixture as a whole were adjusted to appropriate ranges, which presumably resulted in an extremely high discharge rate characteristic. Namely, it is supposed that, in the batteries C to F, all of the following main factors to control the discharge rate characteristic of the negative electrode were kept in favorable states: (1) electric connection between the graphite particles in the negative electrode material mixture layer; (2) the impregnating ability of the negative electrode material mixture layer with the electrolyte; and (3) alleviation of the orientation of the graphite particles.

EXAMPLE 2

The density of the material mixture layer was studied as follows.

Herein used was the negative electrode carbon material "d" (covered natural graphite:carbon nano-tubes=100:5), which had exhibited the most excellent characteristic in Example 1. 100 parts by weight of the negative electrode carbon material "d" was added with 100 parts by weight of a 1-wt %-carboxymethyl cellulose (CMC) aqueous solution and an aqueous dispersion of styrene butadiene rubber (SBR) as a binder, and then kneaded well to prepare a negative electrode material mixture paste. Herein, an amount of the SBR added was 2 parts by weight per 100 parts by weight of the negative electrode carbon material "d".

The obtained negative electrode material mixture paste was applied onto each face of a copper foil (thickness: 10 µm) with a coating machine to have a certain thickness, and then dried with hot air at 100° C., to form a negative electrode material mixture layer. Thereafter, the negative electrode material mixture layer was rolled by pressure with a roll press. At that time, the condition for rolling by pressure was variously changed to produce negative electrodes L, M, N, O and P, with a material mixture layer density of 1.3 g/cm$^3$, 1.4 g/cm$^3$, 1.5 g/cm$^3$, 1.8 g/cm$^3$ and 1.85 g/cm$^3$, respectively.

In the same conditions as in Example 1 except for the use of the negative electrodes L to P, lithium-ion rechargeable batteries L to P, comprising the negative electrodes L to P, were respectively fabricated, and cycle life characteristics (capacity retention ratios) of the respective batteries were evaluated.

The capacity retention ratios at 400th cycles are shown in Table 5. It is found from those results that the density of the negative electrode material mixture layer is preferably in the range of 1.4 g/cm$^3$ to 1.8 g/cm$^3$.

TABLE 4

| Battery | Density of negative electrode material mixture layer (g/cm$^3$) |
|---|---|
| L | 1.3 |
| M | 1.4 |
| N | 1.5 |
| O | 1.8 |
| P | 1.85 |

TABLE 5

| Battery | Capacity retention ratio (%) |
|---|---|
| L | 72 |
| M | 90 |
| N | 91 |
| O | 88 |
| P | 74 |

EXAMPLE 3

The average fiber diameter and the average fiber length of the carbon nano-tubes were studied as follows.

By a heat CVD method in which production conditions were changed, multi-wall carbon nano-tubes (CNTa to CNTe) with high crystallinity, having different average fiber diameters and different average fiber lengths, were produced. Those carbon nano-tubes were analyzed by observing the TEM images and the SEM images thereof, to confirm that all the carbon nano-tubes had a multi-wall structure. The obtained average fiber diameter and average fiber length of each of the carbon nano-tubes are shown in Table 6.

TABLE 6

| Carbon nano-tubes | Average fiber diameter (nm) | Average fiber length (μm) |
|---|---|---|
| CNTa | 5 | 0.5 |
| CNTb | 10 | 0.5 |
| CNTc | 5 | 1 |
| CNTd | 10 | 1 |
| CNTe | 30 | 2 |

In the same conditions as in the case of the negative electrode A in Example 1 except that CNTa to CNTe were used as the carbon nano-tubes and that an amount of the carbon nano-tubes per 100 parts by weight of the covered natural graphite was 5 parts by weight, negative electrodes Q to U were produced Further, in the same conditions as in the case of the battery A except for the use of the negative electrodes Q to U in place of the negative electrode A, lithium-ion rechargeable batteries Q to U, comprising the negative electrodes Q to U, were respectively fabricated, and the cycle life characteristics (capacity retention ratios) of the respective batteries were evaluated in the same conditions as in Example 1.

The capacity retention ratios at 400th cycles are shown in Table 7. It is found from those results that the suitable average fiber diameter and average fiber length of the carbon nano-tubes for the present invention are 10 nm or larger and 1 μm or larger, respectively, and carbon nano-tubes (CNTd, CNTe) satisfying both of the above conditions are most preferably used.

TABLE 7

| Battery | Carbon nano-tubes | Capacity retention ratio (%) |
|---|---|---|
| Q | CNTa | 72 |
| R | CNTb | 83 |
| S | CNTc | 84 |
| T | CNTd | 91 |
| U | CNTe | 92 |

It is to be noted that, in the present example, the covered natural graphite having made spherical was used as the graphite as the main active material of the negative electrode; however, any graphite having made spherical may be used so long as it has an average particle size of not smaller than 5 μm and not larger than 25 μm, a BET specific surface area of 5 m$^2$/g or smaller, and an average particle circularity of 0.85 or larger. The use of graphite having such physical properties allows fabrication of a lithium-ion rechargeable battery excellent in cycle life characteristic, discharge rate characteristic and pulse discharge characteristic, even when the graphite used is graphitized MCMB, graphitized bulk mesophase, artificial graphite obtained by graphitizing a coke, or granulated particles of a coke and coal tar pitch, or the like.

In the present example used as the carbon nano-tubes as the conductive additive were the multi-wall carbon nano-tubes (MWCNT) having high crystallinity and a multi-wall structure, obtained by thermally decomposing hydrocarbon using the iron catalyst; however, a method for producing carbon nano-tubes is not particularly limited. Using any carbon nano-tubes having high crystallinity and a multi-wall structure, with an average fiber diameter of 10 nm or larger and an average fiber length of 1 μm or larger, a similar effect can be obtained.

Moreover, in the present example, although the styrene butadiene rubber (SBR) was used as the binder of the negative electrode material mixture, this is also not particularly limited. For example, even when a rubber binder made of a similar butadiene derivative is used, for example, a similar lithium-ion rechargeable battery can be fabricated.

As the rubber binder, one obtained by copolymerizing butadiene, an aromatic vinyl monomer and an ethylene type unsaturated carboxylic acid ester monomer is preferred. Herein, as the aromatic vinyl monomer, styrene, α-methyl styrene or the like can be used. As the ethylene type unsaturated carboxylic acid ester monomer, acrylic acid ester, methacrylic acid ester or the like can be used. As acrylic acid ester, methyl acrylate, ethyl acrylate, propyl acrylate or the like can be used. Further, as methacrylic acid ester, methyl methacrylate, ethyl methacrylate, propyl methacrylate or the like can be used.

Moreover, in the present example, $LiPF_6$ was dissolved in the mixed solvent of ethylene carbonate (EC), ethyl methyl carbonate (EMC) and diethyl carbonate (DEC) in a volume ratio of 1:2:1 such that the concentration of $LiPF_6$ was 1.0 M, and the obtained solution was used as the non-aqueous electrolyte; however, the non-aqueous electrolyte is not limited thereto.

Furthermore, in the present example, the lithium-ion rechargeable battery was fabricated in such a figuration as the electrode plate assembly in the shape of a substantially quadratic prism was housed in the prismatic battery case made of aluminum alloy; however the figuration of the lithium-ion rechargeable battery of the present invention is not limited thereto.

As thus described, according to the present invention, it is possible to provide a lithium-ion rechargeable battery in which capacity deterioration in the course of charge/discharge cycles is extremely small, and this is highly valuable from the industrial perspective.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. A lithium-ion rechargeable battery, comprising:
a positive electrode capable of absorbing and desorbing lithium ions;
a negative electrode capable of absorbing and desorbing lithium ions;
a separator interposed between said positive electrode and said negative electrode; and
a non-aqueous electrolyte, wherein
said negative electrode comprises a negative electrode current collector and a negative electrode material mixture layer carried on said negative electrode current collector,
said negative electrode material mixture layer comprises graphite and carbon nano-tubes, said graphite being adhered with carbonized pitch, and
an amount of said carbon nano-tubes in said negative electrode material mixture layer is not smaller than 1 part by weight and not larger than 10 parts by weight, per 100 parts by weight of said graphite, wherein said carbon nano-tubes have an average fiber diameter of 50 μm or smaller, and an average fiber length of 5 μm or smaller.

2. The lithium-ion rechargeable battery in accordance with claim 1, wherein said negative electrode material mixture layer has a density of not smaller than 1.4 g/cm$^3$ and not larger than 1.8 g/cm$^3$.

3. A lithium-ion rechargeable battery in accordance with claim 1, wherein said carbon nano-tubes have a multi-wall structure, an average fiber diameter of said carbon nano-tubes is 10 nm or larger, and an average fiber length of said carbon nano-tubes is 1 µm or larger.

4. The lithium-ion rechargeable battery in accordance with claim 1, wherein said graphite has the following physical properties:

(1) a spacing $d_{002}$ between (002) crystal faces, obtained by a powder X-ray diffraction measurement, is 3.365 Å or less;

(2) an average particle size, obtained by a laser diffraction-type particle size distribution measurement, is not smaller than 5 µm and not larger than 25 µm;

(3) a BET specific surface area is 5 m$^2$/g or smaller; and (4) an average particle circularity is 0.85 or larger.

* * * * *